Dec. 30, 1969  J. G. CADIOU  3,486,802
BRAKING PRESSURE LIMITING DEVICES FOR AUTOMOTIVE
OR OTHER VEHICLES
Filed Aug. 22, 1968
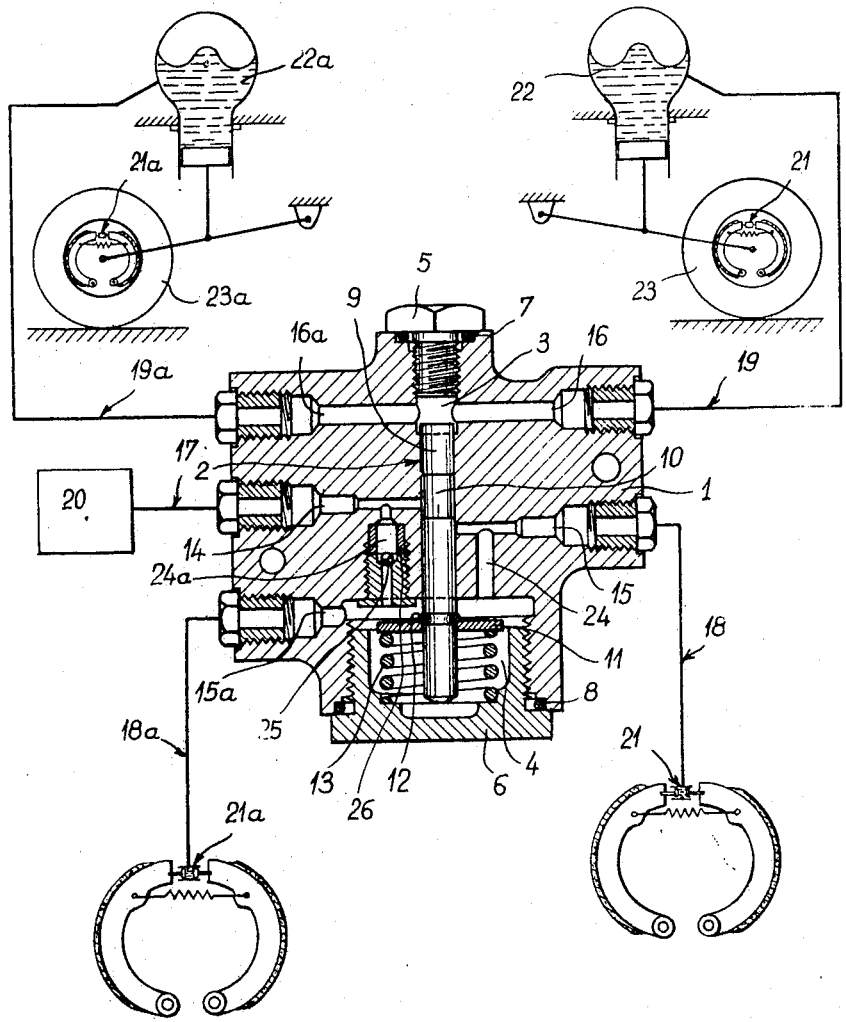
JEAN GEORGES CADIOU,
INVENTOR

United States Patent Office

3,486,802
Patented Dec. 30, 1969

3,486,802
BRAKING PRESSURE LIMITING DEVICES FOR AUTOMOTIVE OR OTHER VEHICLES
Jean Georges Cadiou, Paris, France, assignor to Societe Anonyme Andre Citroen, Paris, France
Continuation-in-part of application Ser. No. 595,387, Nov. 18, 1966. This application Aug. 22, 1968, Ser. No. 754,568
Claims priority, application France, Nov. 26, 1965, 39,920
Int. Cl. B60t 7/00
U.S. Cl. 303—22
1 Claim

ABSTRACT OF THE DISCLOSURE

A limiting device comprising a cylindrical slide valve movable in a body which cuts off or establishes the flow of fluid to the brakes of one of the sets of wheels of a vehicle, the cross section of the ends of the slide valve in contact with the braking fluid at one side being equal to that of the end in contact with the suspension fluid. An elastic element acts upon the slide valve compensating the difference in pressure of said fluids.

---

This application is a continuation-in-part of my application Ser. No. 595,387, filed Nov. 18, 1966, now abandoned, entitled Braking Pressure Limiting Devices for Automotive or Other Vehicles.

This invention relates to braking pressure limiting devices for automotive and other vehicles and has specific reference to a device adapted to braking systems of the hydraulic-fluid actuated type.

It is already known to properly slowing down or stopping a vehicle by either distributing the braking effort between the front and rear axles of the vehicle, or limiting the braking effort exerted on a set of wheels to a maximum value which may be either fixed or variable with the load of the set involved, by using a mechanical, hydraulic or other device. A hydraulic device particularly suitable for a vehicle equipped with a hydro-pneumatic suspension system and with a hydraulic-fluid actuated braking system may comprise for example a differential cylindrical slide valve having a larger face subjected to the pressure of the brake fluid and the opposite, smaller face responsive to the pressure of one of the fluids utilized in the suspension system. This slide valve is adapted to cut off the delivery of actuating fluid to the brakes when the brake fluid pressure exceeds a predetermined value varying with the vehicle load. Another non-differential slide valve device is utilized in spring suspension systems and is submitted to pressure laws different than in case of hydro-pneumatic suspension systems. This spring suspension system needs a separate valve device for each wheel of a vehicle. The operation of these known pressure limiting devices is satisfactory but their cost is relatively high due generally to their complicated design.

It is the chief object of the present invention to avoid this inconvenience and to have a device needing only simple technological operations for mounting.

To this end, the present invention provides a braking pressure limiting device for an automotive or other vehicle having a suspension system utilizing at least one fluid, such as a hydro-pneumatic suspension system, and a brake system actuated by means of a fluid supplied by a pressure control member, said device comprising a single valve body, a cylindrical slide valve having a reduced intermediate portion, equal cross-sections at the ends which contact the fluid for said brake system and the fluid for said suspension system, and movable in said valve body to cut off or restore the delivery of actuating fluid to the brake cylinders of one of the sets of wheels of said vehicle, one resilient return member for said valve and means mounted in said valve body to enable the brake fluid contacting one end of said slide valve to flow back to said pressure control member, and said resilient return member being a spring cooperating with said slide valve to compensate the pressure differential of said fluids.

Under these conditions, when a predetermined pressure differential occurs the slide valve has a well-defined position corresponding for example to the cutting off of any delivery of pressure fluid to the brakes of the train of wheels. As a result, the maximum braking pressure increases as a function of the pressure prevailing in the suspension system and of the load supported by the train of wheels involved.

By calling $p_1$ the pressure of the fluid of the hydropneumatic suspension, $p$ the braking fluid pressure, R the tension of the spring and $s$ the cross-section of the slide valve, one has $$p = p_1 - \frac{R}{s}$$

It follows that the braking pressure presents a constant difference with the pressure due to the suspension while in the case of some known devices such is proportional to it.

Other features of this invention will appear as the following description proceeds with reference to the single figure of the accompanying drawing showing diagrammatically by way of example a typical form of embodiment of the pressure limiting device of this invention.

Referring to the drawing, the device comprises a body 1 disposed preferably vertically and formed with a central cylindrical bore 2 having a slightly larger upper portion 3 and opening at its lower end into a relatively larger chamber 4, the end portions 3 and 4 being made fluid-tight by means of a plug 5 and a cover 6 pressing adequate gaskets 7 and 8. Slidably mounted in the bore 2 is a cylindrical slide valve 9 having an intermediate axial portion 10 of reduced diameter and carrying a washer 11 retained on this valve by means of a circlips or a shoulder 12. A coil compression spring 13 engaging the lower face of this washer 11 and the inner face of cover 6 constantly urges the slide valve 9 upwards, the upward and downward strokes of this slide valve being limited by said plug 5 and cover 6.

On the other hand, in the larger lateral walls of cylinder 2, of said upper portion 3 of the cylinder bore and of chamber 4, ducts 14 and 15, 16 and 16a, and 15a are formed which are connected respectively through pipe lines 17 and 18, 19 and 19a, and 18a to a pressure-fluid control member 20, for example a master cylinder, adapted to deliver brake fluid under pressure to a brake cylinder 21, to vessels 22 and 22a filled with fluid under pressure and forming part of a suspension system, for example of the hydro-pneumatic type, of a set of wheels 23 and 23a of the vehicle, and to another receiving cylinder 21a, these cylinders 21 and 21a actuating the brakes mounted respectively on the wheels 23 and 23a shown in a reduced scale.

Other ducts 24 and 24a connect the chamber 4 to ducts 14 and 15, duct 24a being provided with a check valve 25 controlling the passage of fluid to duct 14. This valve may be of the ball type without any spring, if the body 1 of the device of this invention is mounted in a vertical position, the gravity effect being completed if desired by a member 26 of suitable elastomeric material, adapted to urge the ball 25 to its seated position while permitting the passage of fluid when the ball is unseated.

It should be noted that when the slide valve 9 is in its lower position it causes the member 20 or master cylinder controlling the delivery of brake fluid to communicate with the brake cylinders 21 and 21a through the medium of ducts 14, 15, 24, 15a and chamber 4, the narrower portion 10 of the slide valve registering with the ports of ducts 14 and 15. On the other hand, ducts 15a, 15 and 16a opening into the wider portions 3 and 4 of cylinder 2 cause the brake and suspension fluids to constantly contact the ends of the slide valve irrespective of its position.

As a result, the above-described device operated as follows:

In the brake release position the slide valve 9 is in its lowermost position as the spring 13 is not capable of balancing the force of the suspension fluid pressure.

When the brakes are applied, fluid under pressure is delivered from member 20 to chamber 4 and brake cylinders 21 and 21a, as the slide valve is in its lowermost position. When the fluid pressure in chamber 4 attains a predetermined value the slide valve 9 moves upwards, thus closing the port of duct 15 and holding the brake fluid pressure at this predetermined value.

When the brake control member, for instance the brake pedal, is released, the valve 25 permits the return of any fluid contained in chamber 4 to the control member 20 and the cylindrical slide valve is thus allowed to resume its lowermost position.

Of course, the specific form of embodiment illustrated in the drawing and described hereinabove should not be construed as limiting the present invention since many modifications may be brought thereto without departing from the spirit and scope of the invention.

I claim:

1. Braking pressure limiting device for an automotive or other vehicle having a suspension system utilizing at least one fluid, such as a hydro-pneumatic suspension system, and a brake system actuated by means of a fluid supplied by a pressure control member, said device comprising a single valve body, a cylindrical slide valve having a reduced intermediate portion, equal cross-sections at the ends which contact the fluid for said brake system and the fluid for said suspension system, and movable in said valve body to cut off or restore the delivery of actuating fluid to the brake cylinders of one of the sets of wheels of said vehicle, one resilient return member for said valve, means mounted in said valve body to enable the brake fluid contacting one end of said slide valve to flow back to said pressure control member, said resilient return member being a spring cooperating with said slide valve to compensate the pressure differential of said fluids, and a check valve incorporated in said single valve body for the brake fluid flow back to said pressure control member.

References Cited

UNITED STATES PATENTS

| | | | |
|---|---|---|---|
| 2,207,173 | 7/1940 | Goepfrinch. | |
| 3,245,729 | 4/1966 | Shellhause. | |
| 3,306,678 | 2/1967 | Lepelletier | 303—22 |

FOREIGN PATENTS 939,883　10/1963　Great Britain.

MILTON BUCHLER, Primary Examiner

JOHN J. McLaughlin, Jr., Assistant Examiner

U.S. Cl. X.R.

188—195; 303—6